United States Patent [19]
Takeda et al.

[11] Patent Number: 5,535,843
[45] Date of Patent: Jul. 16, 1996

[54] TRAVELING CARRIAGE

[75] Inventors: Shigeru Takeda, Aichi-ken; Akito Torii, Okazaki; Naoki Matsumoto, Aichi-ken; Tetsuya Kominami, Oobu, all of Japan

[73] Assignee: Nippondenso Co., Ltd., Kariya, Japan

[21] Appl. No.: 361,000

[22] Filed: Dec. 20, 1994

[30] Foreign Application Priority Data

Dec. 20, 1993 [JP] Japan .................................. 5-319735

[51] Int. Cl.⁶ ................................................ B60S 9/205
[52] U.S. Cl. ........................................ 180/200; 180/6.5
[58] Field of Search ................................ 180/199, 200, 180/202, 203, 209, 22, 23, 24.02, 6.48, 6.5; 280/761

[56] References Cited

FOREIGN PATENT DOCUMENTS

| | | |
|---|---|---|
| 59-000711 | 1/1984 | Japan . |
| 59-128610 | 7/1984 | Japan . |
| 59-167059 | 11/1984 | Japan . |
| 60-248475 | 12/1985 | Japan . |
| 5-270396 | 10/1993 | Japan . |

Primary Examiner—Paul N. Dickson
Attorney, Agent, or Firm—Cushman Darby & Cushman

[57] ABSTRACT

A traveling carriage includes driven wheels for running on a running surface. For changing a running direction of the traveling carriage, the driven wheels are raised and separated from the running surface by an elevator mechanism and then turned to change their steered directions by a steering mechanism. While changing the steered directions of the driven wheels, the traveling carriage is fixed relative to the running surface by simple-structured leg-like members. Further, the driven wheels have their own turning centers to turn thereabout for changing their steered directions. This realizes a reduced turning radius for each of the driven wheels. Further, since the driven wheels are turned in phase with each other, the stable running of the traveling carriage is ensured.

14 Claims, 16 Drawing Sheets

TRAVELING CARRIAGE

BACKGROUND OF THE INVENTION

1. Field of the Invention

The present invention relates to a traveling carriage for use with devices, for example, a mobile robot, an automotive vehicle and a toy, which run or travel using driven wheels.

2. Description of the Prior Art

Traveling carriages which are movable in all directions are known including, for example, Japanese First (unexamined) Patent Publication Nos. 59-711 and 59-128610. The typical structure is shown in the latter publication and will be briefly explained with reference to FIGS. 22 to 24.

In the figures, a traveling carriage 1 includes left and right driven wheels 5, a pair of electric motors 6 for driving the corresponding driven wheels 5, respectively, and a rotary plate 3 holding the driven wheels 5 and the motors 6. Electromagnets 13 are further provided for prohibiting rotation of the rotary plate 3 during normal running of the traveling carriage 1. The traveling carriage 1 further includes four jacks for raising a carriage body 8 from a running surface 15 when the rotary plate 3 rotates to change a traveling direction of the traveling carriage 1.

During normal running, the electromagnets 13 are energized so that the rotary plate 3 is fixedly held against the carriage body 8 due to the attraction force of the energized electromagnets 13. In this state, the traveling carriage 1 runs straight by rotating the left and right driven wheels 5 in the same direction.

To run the traveling carriage 1 laterally, the electromagnets 13 is de-energized to release the attraction force applied to the rotary plate 3. Subsequently, the four jacks 12 are extended to raise the carriage body 8 relative to the running surface 15 with the driven wheels 5 remaining on the running surface 15. Accordingly, the carriage body 8 and the rotary plate 3 are spaced apart from each other. In this state, when the left and right driven wheels 5 are rotated in opposite or reverse directions from each other, the driven wheels 5 run on the running surface 15 so as to rotate the rotary plate 3 about a rotation shaft 9. When the rotary plate 3 is rotated by a desired angle, for example, by 90°, the jacks 12 are contracted to lower the carriage body 8. Subsequently, the electromagnets 13 are energized to hold the carriage body 8 and the rotary plate 3 firmly together. By rotating the left and right driven wheels 5 in the same direction in this state, the traveling carriage 1 runs straight laterally, that is, changing the traveling direction by 90°.

However, in the traveling carriage 1, when the running surface 15 is not flat with recessed portions P present on the running surface 15 as shown in FIG. 23, frictional forces between the driven wheels 5 and the running surface 15 are reduced so as to possibly disable rotation of the rotary plate 3. Further, the traveling carriage 1 uses four jacks 12 for separating the carriage body 8 and the rotary plate 3 from each other. However, usage of four jacks inevitably makes the structure complicated. Further, when extending or contracting the jacks 12, particular control is necessary for operating all the jacks 12 simultaneously. Moreover, in the traveling carnage 1, two driven wheels 5 are arranged relative to one rotary plate 3. Accordingly, as shown in FIG. 24, in order to rotate the rotary plate 3 about a rotation center 121, a rotation radius R2 should be set relatively large. Since the rotary plate 3 along with the driven wheels 5 is arranged to rotate about the rotation center 121 within the carriage body 8, the carriage body 8 should be increased in size correspondingly. On the other hand, when the driven wheels 5 are arranged to be steered independently of each other for reducing the rotation radius of the rotary plate 3, an offset in steering phase is likely to occur between the left and right driven wheels 5, resulting in unstable running of the traveling carriage.

SUMMARY OF THE INVENTION

Therefore, it is an object of the present invention to provide an improved traveling carriage.

According to one aspect of the present invention, a traveling carriage adapted for running on a running surface comprises a frame; at least a pair of driven wheels to be driven by drive source means; elevator means for raising or lowering the driven wheels relative to the frame; fixing means for fixing the frame relative to the running surface when the driven wheels are raised by the elevator means and separated from the running surface; and steering means for changing steered directions of the driven wheels when the driven wheels are separated from the running surface with the frame being fixed relative to the running surface by the fixing means.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENT

Now, preferred embodiments of the present invention will be described with reference to the accompanying drawings.

Figure 1:
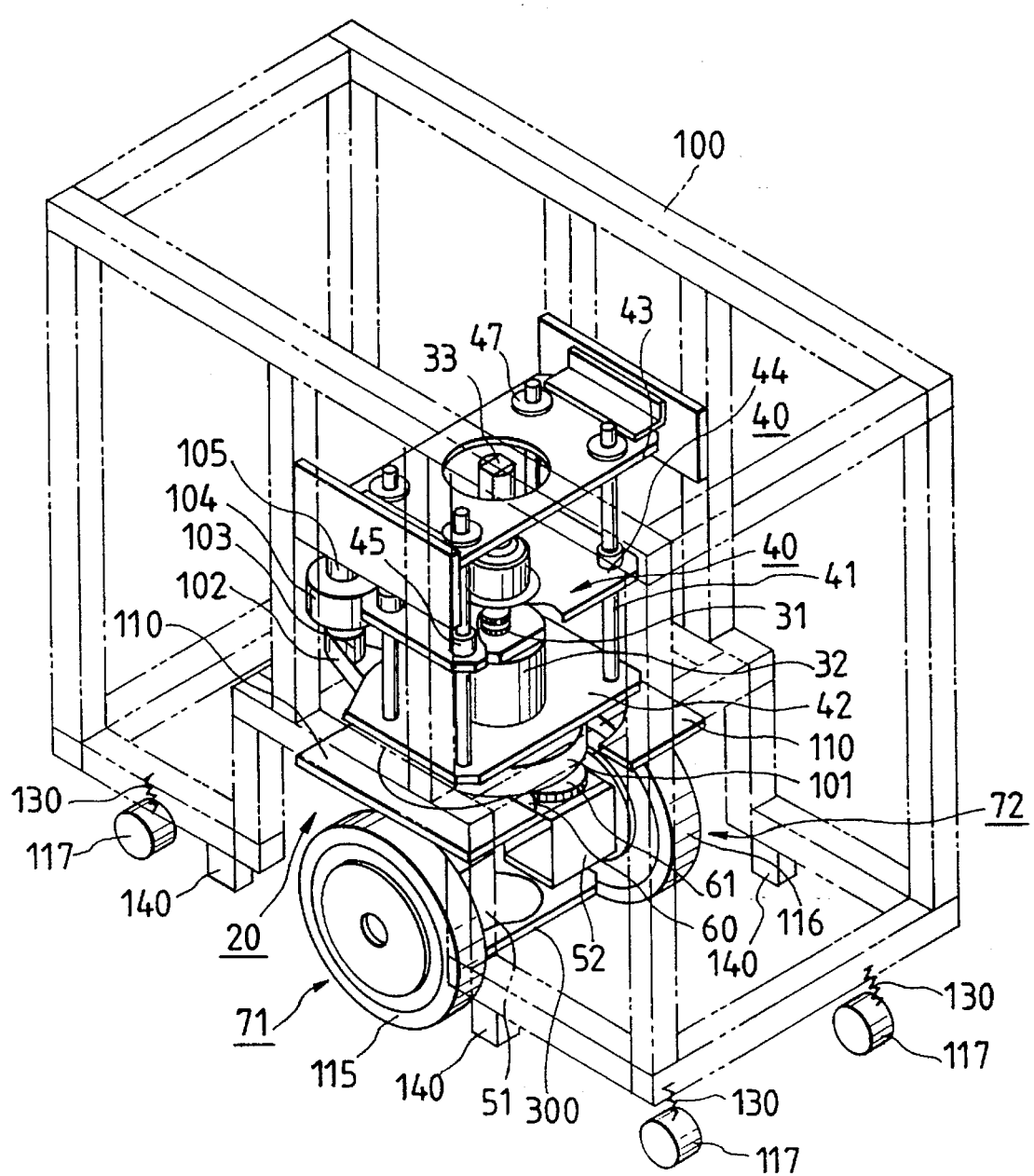
FIG. 1 is a perspective view showing an overall structure of a traveling carriage according to a first preferred embodiment of the present invention.
Figure 2:
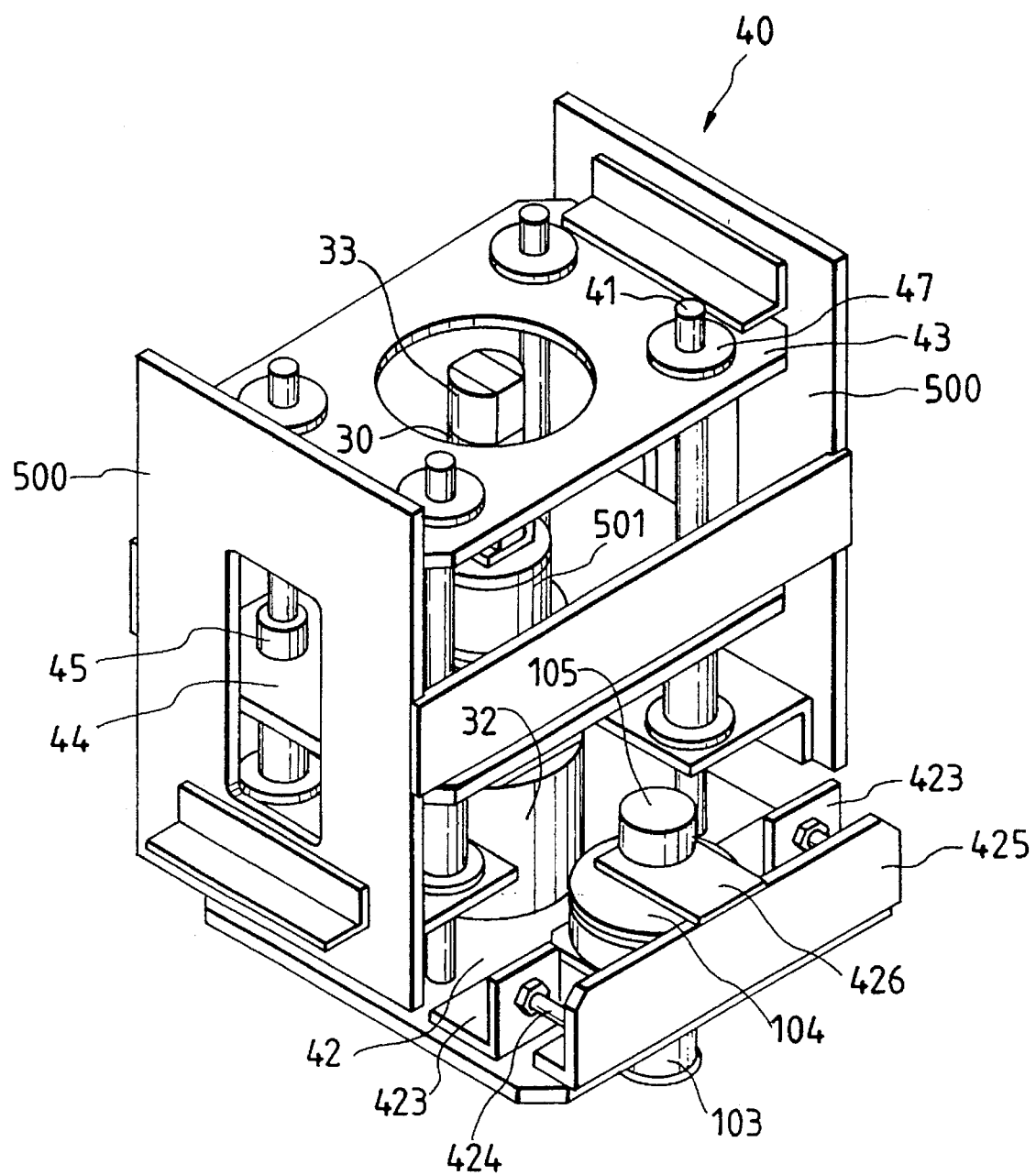
FIG. 2 is a perspective view showing an elevator section of the traveling carriage shown in FIG. 1 on an enlarged scale.
Figure 3:
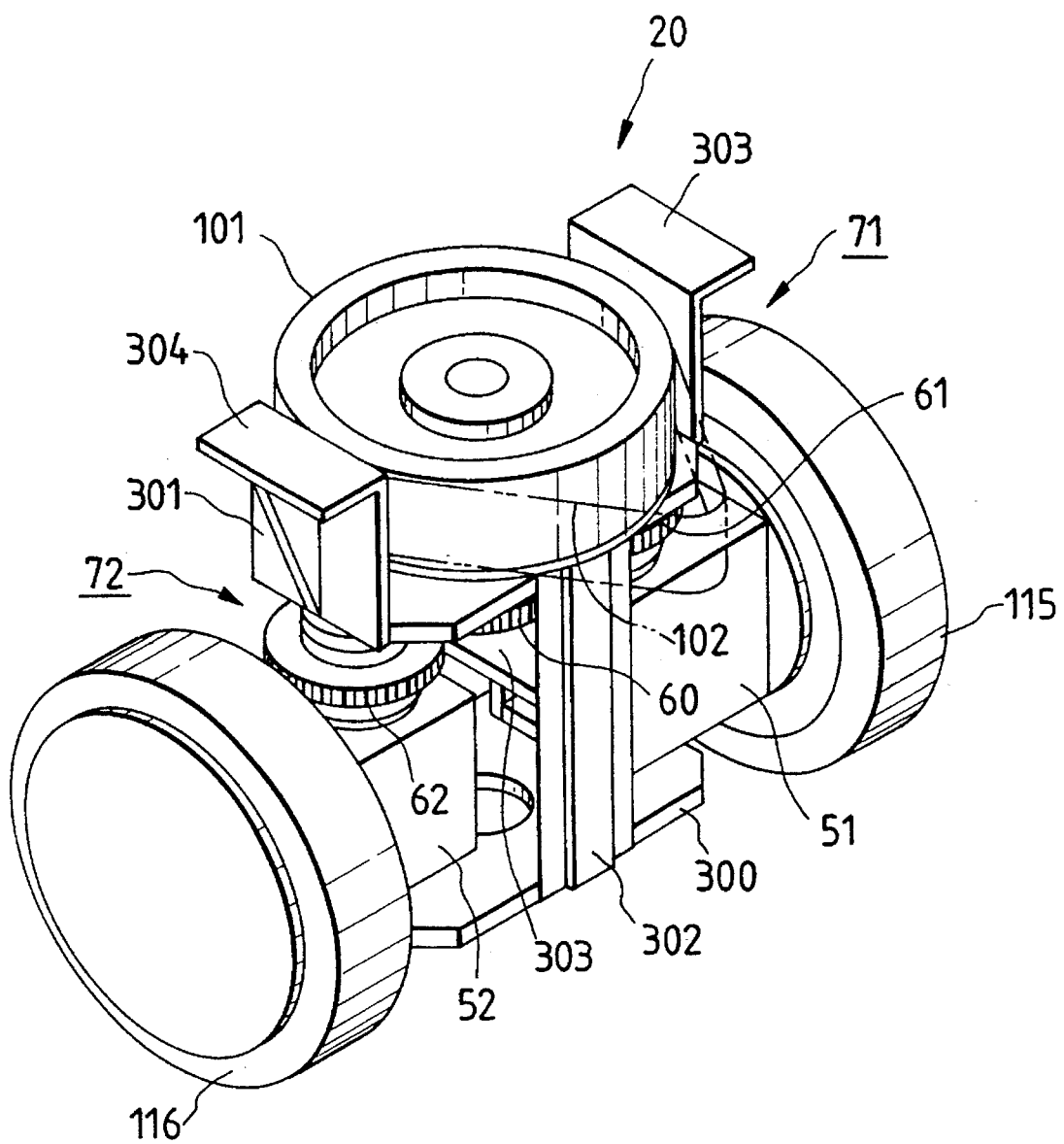
FIG. 3 is a perspective view showing a driver section of the traveling carriage shown in FIG. 1 on an enlarged scale.

FIGS. 1 to 3 show a structure of a traveling carriage according to a first preferred embodiment of the present invention. FIG. 1 is a perspective view showing the overall structure of the traveling carriage, FIG. 2 is a perspective view showing an elevator section 40 of the traveling carriage and FIG. 3 is a perspective view showing a driver section 20 of the traveling carriage. As will be appreciated, FIG. 1 is the perspective view seen from one longitudinal side, while FIGS. 2 and 3 are the perspective views seen from the opposite longitudinal side, respectively. For convenience, it is assumed that FIG. 1 is the perspective view seen from a rear side of the traveling carriage.

The driver section 20 will be first described with reference to FIG. 3. In FIG. 3, numerals 115 and 116 denote left and right driven wheels which are connected to drive sources (not shown), such as, motors, respectively, so as to be driven thereby. Numerals 51 and 52 denote motor covers housing the motors therein, respectively. Left and right travel sections 71 and 72 are constituted by the driven wheels 115, 116, the motors and the motor covers 51, 52, respectively. These travel sections 71 and 72 have their own independent turning axes or centers about which they can selectively make pivotal or turning motions, respectively.

A lower cover 300 and an upper cover 301 are coupled together via a coupling plate 302. Further, a middle cover 303 is fixed to an intermediate portion of the coupling plate 302.

Numerals 61 and 62 denote left and right spur gears which are arranged on the pivoting or turning centers of the travel sections 71 and 72 and fixed on the motor covers 51 and 52, respectively. Gear shafts of the spur gears 61 and 62 are rotatably supported on a lower surface of the upper cover 301 at their upper ends, respectively, and rotatably supported on an upper surface of the lower cover 300, respectively. Numeral 60 denotes a center spur gear meshed with the left and right spur gears 61 and 62. A gear shaft of the center spur gear 60 is rotatably supported on an upper surface of the middle cover 303 at its lower end, while extends through the upper cover 301 via a bearing so as to be coupled to a large pulley 101 at its upper end. The center spur gear 60 and the left and right spur gears 61 and 62 are connected to each other for ensuring pivotal motions of the travel sections 71 and 72 in phase with each other. Instead, a linkage or a belt may be used for allowing pivotal motions of the travel sections 71 and 72 in phase with each other.

Now, the elevator section 40 will be described with reference to FIG. 2. In FIG. 2, a pair of L-shaped plates 423 are fixedly provided on the lower plate 42. Each of the L-shaped plates 423 is coupled with one end of a coupling bar 424 which can extend or contract in an axial direction. The other ends of the coupling bars 424 are coupled to a wide plate 425. The plate 425 slides on the lower plate 42 by adjusting the axial extension/contraction motion of the coupling bars 424. To an upper edge of the plate 425 is fixed a coupling plate 426 to which an encoder 105 is fixed.

A negative-actuated electromagnetic brake 104 is fixed on the plate 425 and is connected to the encoder 105 at its upper end. The electromagnetic brake 104 is further coupled at its lower end with a small pulley 103 via a shaft passing through openings which are formed in the plate 425 and the lower plate 42, respectively. This small pulley 103 and the foregoing large pulley 101 are connected to each other via a belt 102 so that rotation of the large pulley 101 is transmitted to the small pulley 103. A rotation angle of the small pulley 103, which represents a turning angle of the driver section 20, is monitored by the encoder 105.

Instead of monitoring the rotation angle of the small pulley 103, a rotation angle of one of the driven wheels may be monitored and converted to a turning angle of the driver section 20. Further, when only two pivotal positions of the driver section 20, that is, pivotal positions of the driver section 20 for forward-rearward running and lateral running, are necessary, limit switches may be used to monitor the two positions.

The lower plate 42 is a rectangular flat plate. A nut 32 of a ball screw 31 is fixed on an upper surface of the lower plate 42. Four linear shafts 41 are further fixed on the upper surface of the lower plate 42. The linear shafts 41 are provided for ensuring a later-described smooth elevator operation and each provided with upper and lower direct-acting slide portions 47 and 45 working as guides. The lower plate 42 is fixed at its lower surface to mounting flange portions 304 of the upper cover 301 of the driver section 20 with a given spacing from the large pulley 101.

Above the lower plate 42, an intermediate plate 44 is arranged. An upper plate 43 is further arranged above the intermediate plate 44. The intermediate plate 44 and the upper plate 43 are fixed to side plates 500 at their left and right sides. The side plates 500 are fixed to a frame 100. The foregoing linear shafts 41 slidably penetrate the intermediate plate 44 and the upper plate 43, and the foregoing direct-acting slide portions 45 and 47 working as guides are provided on the intermediate and upper plates 44 and 43 at those penetrating portions.

On the intermediate plate 44, reduction gears 501 are arranged. Above the reduction gears 501, a servomotor 30 attached with an encoder 33 is provided. Specifically, the encoder 33 monitors a rotation angle of the servomotor 30, and the reduction gears 501 reduce a revolution speed of the servomotor 30 for transmitting to the ball screw 31. The ball screw 31 penetrates the intermediate plate 44 and screws into the nut 32 fixed on the lower plate 42. Accordingly, when the servomotor 30 is activated to rotate the ball screw 31, the nut 32 moves vertically along the ball screw 31 so that the driver section 20 is raised or lowered via the fixed engagement between the lower plate 42 and the mounting flange portions 304 of the upper cover 301. As appreciated, the nut 32 moves upward or downward depending on the rotating direction of the servomotor 30.

Instead of the ball screw 31 and the nut 32, other mechanisms, such as, rack and pinion, for converting a rotational motion to a linear motion may be used. Alternatively, instead of the servomotor 30, the ball screw 31 and the nut 32, a direct-acting motor may be used to form a mechanism which makes a linear motion as a whole.

In FIG. 1, numerals 110 represent a pair of flat plates separately arranged on left and right sides of the traveling carriage. Each of the flat plates 110, 110 has a semicircular cutout at its inward side and works as a steering plate for steering the corresponding driven wheel. The steering plates 110, 110 are arranged above the left and right driven wheels 115, 116 respectively, and fixed to the frame 100. Specifically, the steering plates are positioned such that, when the driver section 20 is raised, the driven wheels 115, 116 abut against lower surfaces of the steering plates 110, 110 so as to be able to rotate thereon.

Numerals 117 represent casters mounted at a lower side of the frame 100 via caster springs 130 at four locations, that is, forward and reward of the driven wheels 115, 116. The traveling carriage is stably supported by the four casters 117 as compliance wheels and the left and right driven wheels 115, 116 during the normal running.

It is to be appreciated that at least one caster 117 is necessary for supporting the carriage. For example, when only one caster 117 is provided, the driven wheels 115, 116 may be displaced forward or rearward as compared with FIG. 1 and the caster 117 may be provided at a rearward or forward center so as to support the carriage with a layout similar to a tricycle.

Numerals 140 represent outriggers arranged at the lower side of the frame 100 at four locations, that is, forward and rearward of the driven wheels 115, 116. Each of the outriggers 140 is in the form of leg having a flat lower end surface. The outriggers 140 are provided for holding the carriage securely on a running surface 200 when the driven wheels 115, 116 are raised by the elevator section 40 to be separated from the running surface 200. When the frame 100 can be supported by the casters 117 and the caster springs 130 to a sufficient degree, only one outrigger 140 may be enough. However, in this case, an area of the flat lower end surface of the outrigger 140 may be set larger so as to prevent the carriage, when the running surface 200 is inclined, from moving along the inclined running surface 200.

Now, a sequence of steering the travel sections 71 and 72 will be described with reference to FIGS. 4A to 7B.

Figure 4A:
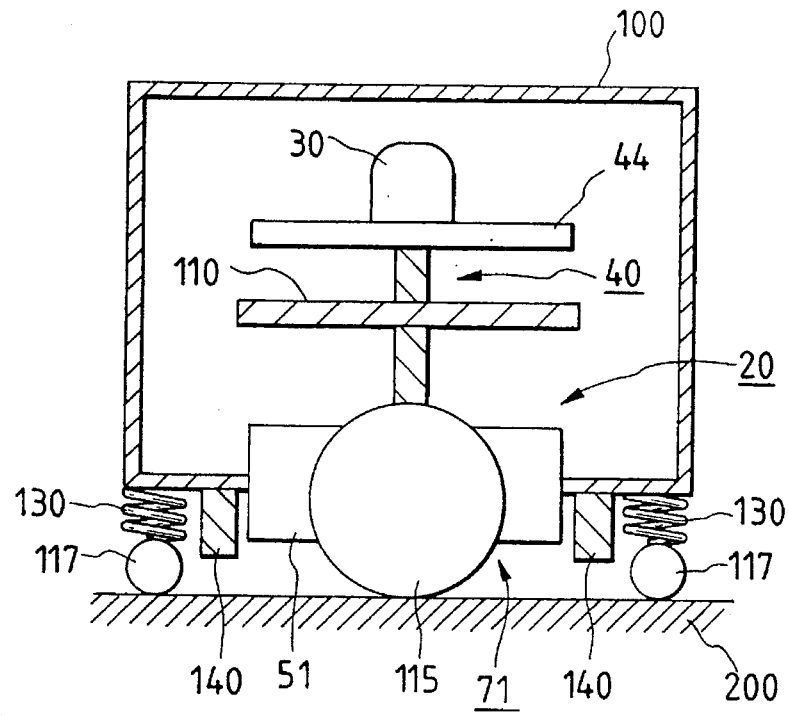
FIG. 4A is a diagram for explaining an operation of the traveling carriage of FIG. 1, wherein driven wheels are at a given lowered position and the traveling carriage is shown in side elevation.
Figure 4B:
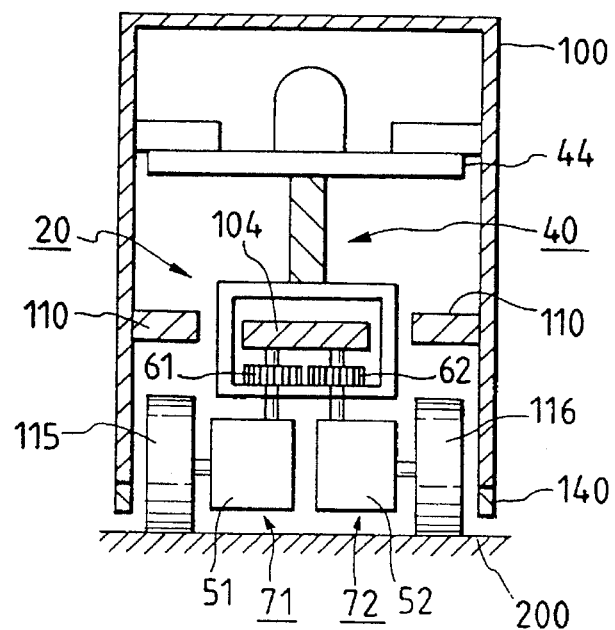
FIG. 4B is a diagram for explaining the operation of the traveling carriage of FIG. 1, wherein the driven wheels are at the given lowered position and the traveling carriage is shown in front elevation.

First, when performing the normal running, as shown in FIGS. 4A and 4B, the driver section 20 is lowered by the elevator section 40 to a predetermined vertical level so as to place the driven wheels 115, 116 on the running surface 200. A vertical level of the driver section 20, that is, the driven wheels 115, 116 is monitored and controlled by the encoder 33. At this time, the negative-actuated electromagnetic brake 104 is not energized so that its braking operation is effective. Accordingly, the small pulley 103 and thus the large pulley 101 are prohibited from rotating so that the center spur gear 60 coupled to the large pulley 101 and the left and right spur gears 61, 62 are also prohibited from rotating. This causes angular positions of the driven wheels 115, 116 to be fixed relative to the foregoing turning axes, respectively. In this state, when the driven wheels 115, 116 are rotated in the same direction, the traveling carriage runs straight on the running surface 200.

Figure 5A:
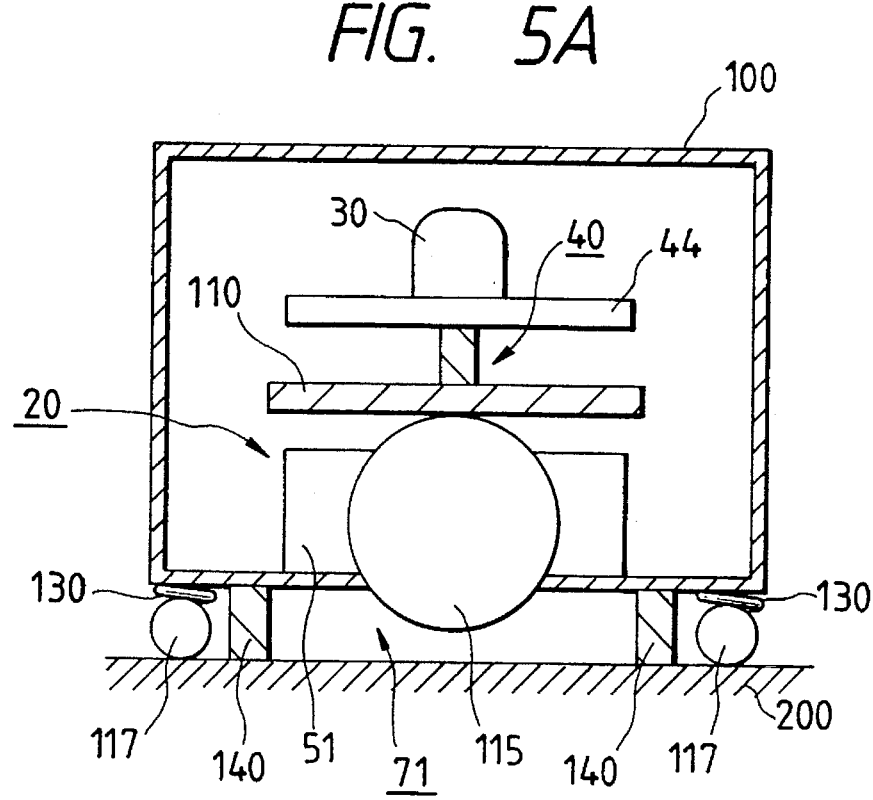
FIG. 5A is a diagram for explaining the operation of the traveling carriage of FIG. 1, wherein the driven wheels are at a given raised position and the traveling carriage is shown in side elevation.
Figure 5B:
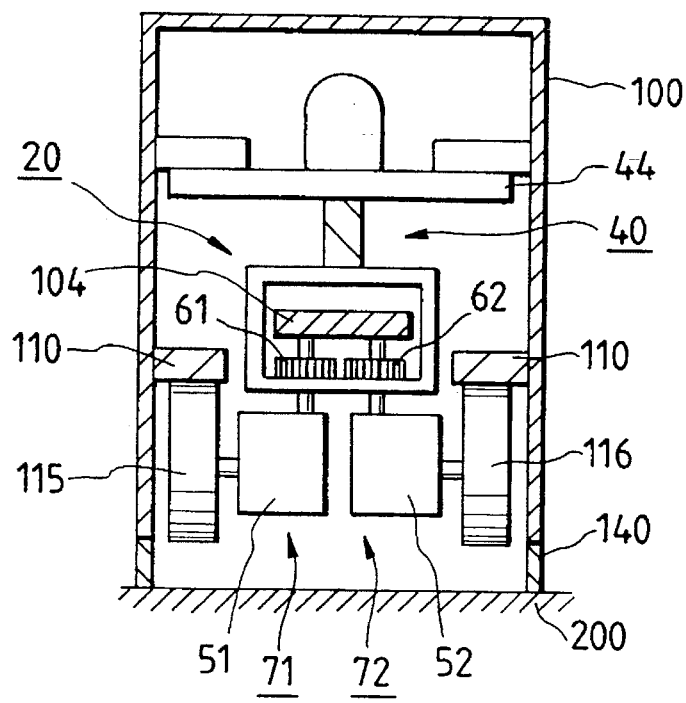
FIG. 5B is a diagram for explaining the operation of the traveling carriage of FIG. 1, wherein the driven wheels are at the given raised position and the traveling carriage is shown in front elevation.

On the other hand, when turning the travel sections 71 and 2, as shown in FIGS. 5A and 5B, the driver section 20 is raised by the elevator section 40 to a predetermined vertical level so that the driven wheels 115, 116 abut against the lower surfaces of the steering plates 110, respectively. As described above, the vertical level of the driver section 20 is monitored and controlled by the encoder 33. Instead, limit switches or stoppers may be arranged at the raised point where the driven wheels 115, 116 are in abutment with the steering plates 110, at the lowered point where the driven wheels 115, 116 are placed on the running surface 200 and at other required points, so as to stop the driver section 20 at the respective points.

When the driven wheels 115, 116 are raised by the elevator section 40 to be separated from the running surface 200, the frame 100 is securely held relative to the running surface 200 by means of the outriggers 140.

Specifically, when the driver section 20 is at the lowered position (for the normal running), the traveling carriage is supported by the two driven wheels 115, 116 and the four casters 117. On the other hand, when the driver section 20 starts to be raised, the caster springs 30 are compressed so that the frame 100 is sunk or lowered to gradually increase loads applied to the casters 117. Thereafter, the flat lower end surfaces of the outriggers 140 abuts on the running surface 200. At this instant, the traveling carriage is supported by the two driven wheels 115, 116, the four casters 117 and the four outriggers 140. When the driver section 20 is further raised, the driven wheels 115, 116 are separated from the running surface 200 so that the traveling carriage is supported by the four casters 117 and the four outriggers 140 to be fixed on the running surface 200.

As described above, in this preferred embodiment, fixing means, that is, the casters 117 and the outriggers 140, for fixing the traveling carriage on the running surface is not associated with a power source, but uses a self-weight of the frame 100 to fix the carriage on the running surface 200.

Figure 6A:
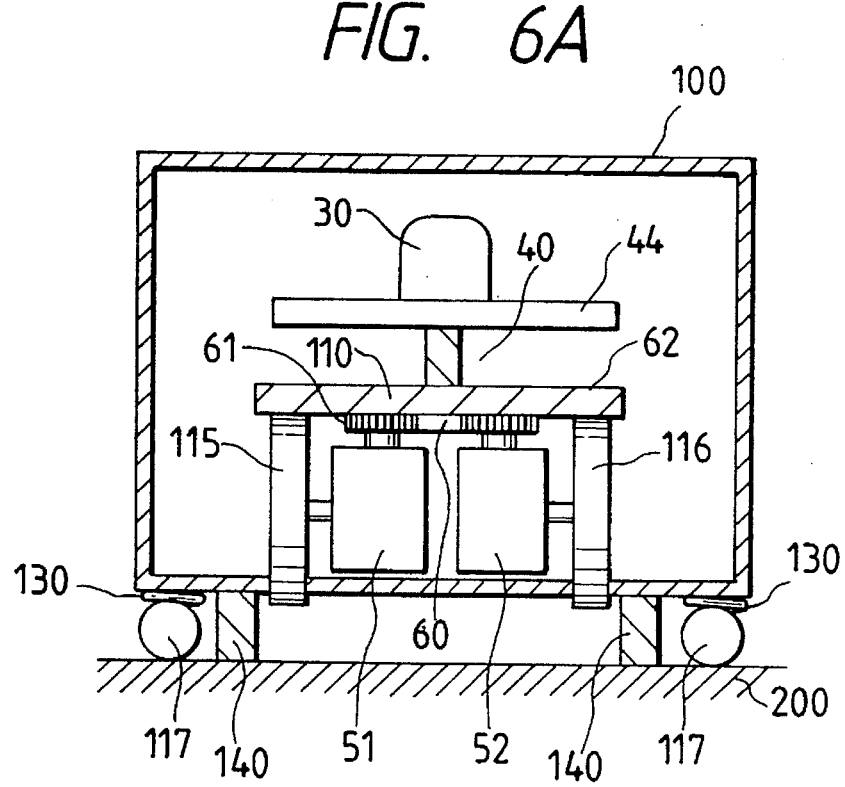
FIG. 6A is a diagram for explaining the operation of the traveling carriage of FIG. 1, wherein the driven wheels are steered to turn and the traveling carriage is shown in side elevation.
Figure 6B:
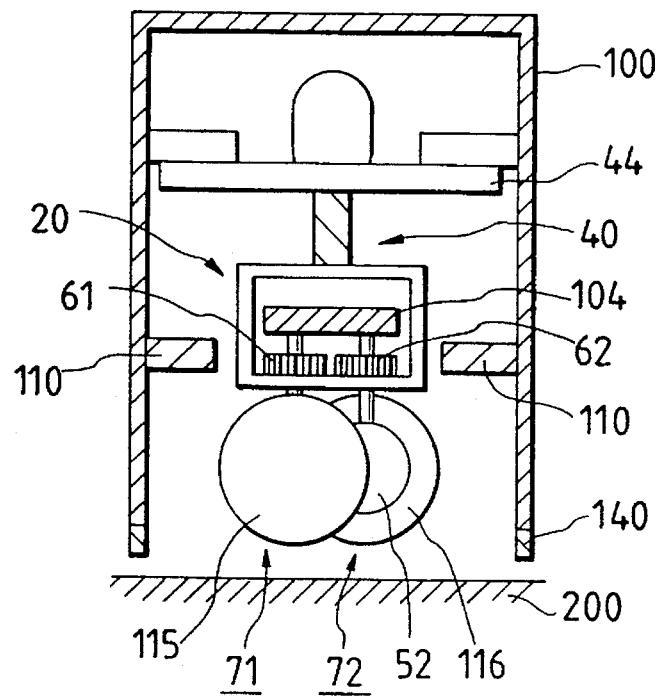
FIG. 6B is a diagram for explaining the operation of the traveling carriage of FIG. 1, wherein the driven wheels are steered to turn and the traveling carriage is shown in front elevation.

Subsequently, as shown in FIGS. 6A and 6B, the negative-actuated electromagnetic brake 104 is energized to release its braking operation so as to set the travel sections 71, 72 to be turnable. Then, the driven wheels 115, 116 are rotated in opposite directions from each other while the driven wheels 115, 116 remain in abutment with the steering plates 110. This causes the driven wheels 115, 116 to run on the lower surfaces of the steering plates 110, respectively, so that, due to the engagement of the left and right spur gears with the center spur gear 60, the travel sections 71, 72 turn in phase with each other about turning axes or centers 122 and 123 (see FIG. 8), respectively, relative to the frame 100.

As appreciated, in this preferred embodiment, the driven wheels 115, 116 are turned to change their steered directions while they are raised and separated from the running surface 200. Accordingly, irrespective of a condition of the running surface 200, the driven wheels 115, 116 can be reliably steered to change their steered directions. Further, since the travel sections 71, 72 and thus the driven wheels 115, 116 are steered to turn in phase with each other, the stable running of the carriage is ensured.

Turning angles of the driven wheels 115, 116 and thus the travel sections 71, 72 are monitored and controlled by the encoder 105. In this preferred embodiment, the encoder 105 actually monitors the rotation angle of the small pulley 103. Instead, as described before, a rotation angle of one of the driven wheels may be monitored so as to control the turning motions of the travel sections 71 and 72. Further, limit switches or stoppers may be used so as to stop the turning motions of the travel sections 71, 72 at given positions to control the turning angles of the driven wheels 115, 116.

Figure 7A:
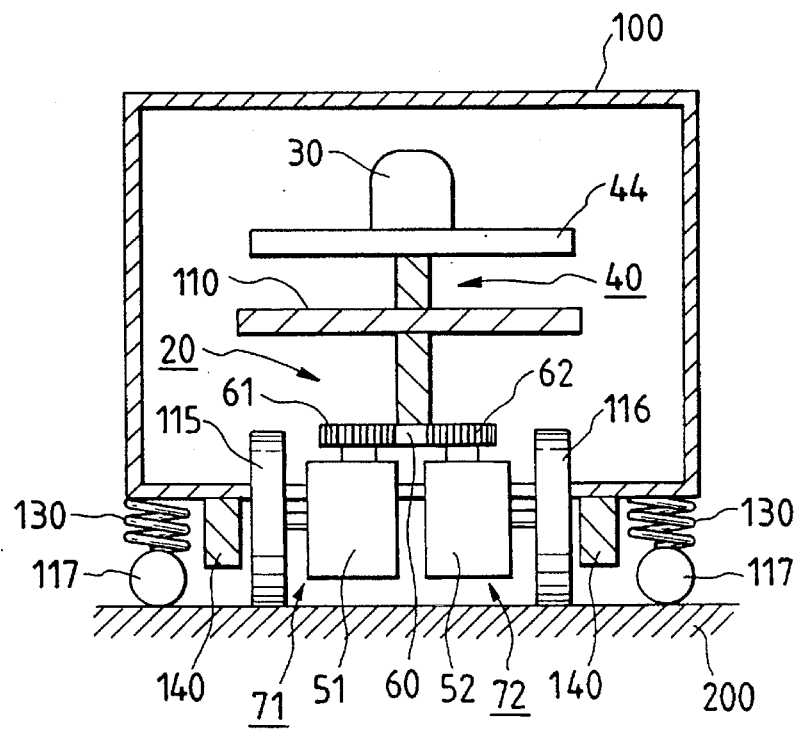
FIG. 7A is a diagram for explaining the operation of the traveling carriage of FIG. 1, wherein the driven wheels are returned to the given lowered position and the traveling carriage is shown in side elevation.
Figure 7B:
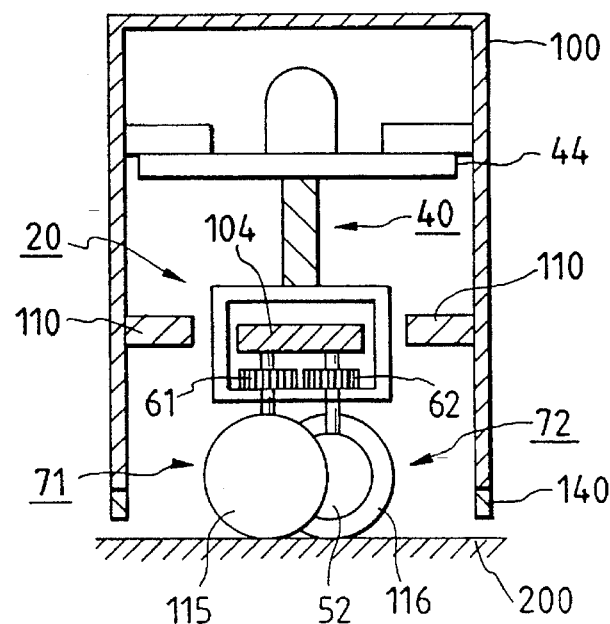
FIG. 7B is a diagram for explaining the operation of the traveling carriage of FIG. 1, wherein the driven wheels are returned to the given lowered position and the traveling carriage is shown in front elevation.

Subsequently, as shown in FIGS. 7A and 7B, the negative-actuated electromagnetic brake 104 is deenergized so as to prohibit further pivotal displacement of the travel sections 71 and 72. Then, the elevator section 40 is activated to lower the driven wheels 115, 116 to the foregoing given lowered position (for the normal running) so that the outriggers 140 are separated from the running surface 200. In this state, when the driven wheels 115, 116 are rotated in the same direction, the carriage runs straight in the new direction.

As appreciated, the driven wheels 115, 116 can be oriented in a desired direction by adjusting the pivotal movement of the travel sections 71, 72. For example, when the travel sections 71, 72 are turned by 90°, the carriage can run in a direction perpendicular to a longitudinal axis of the carriage.

Figure 8:
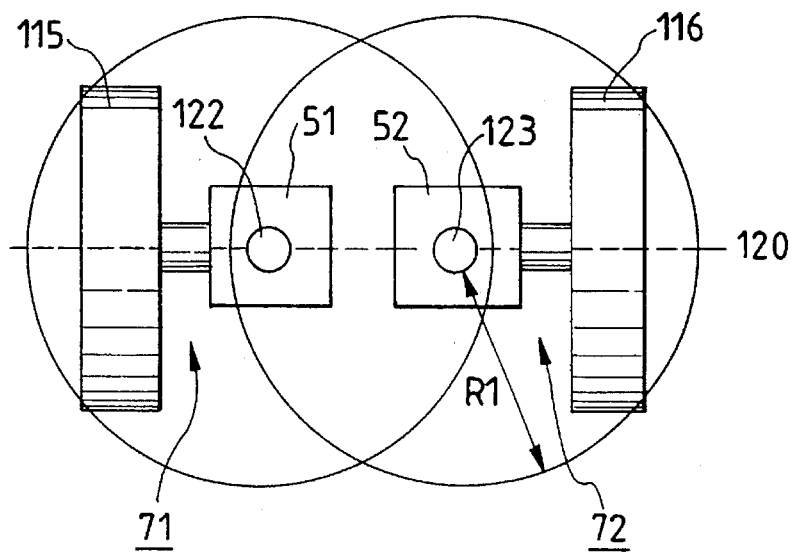
FIG. 8 is a diagram for explaining a turning radius of each of the driven wheels according to the first preferred embodiment.
Figure 24:
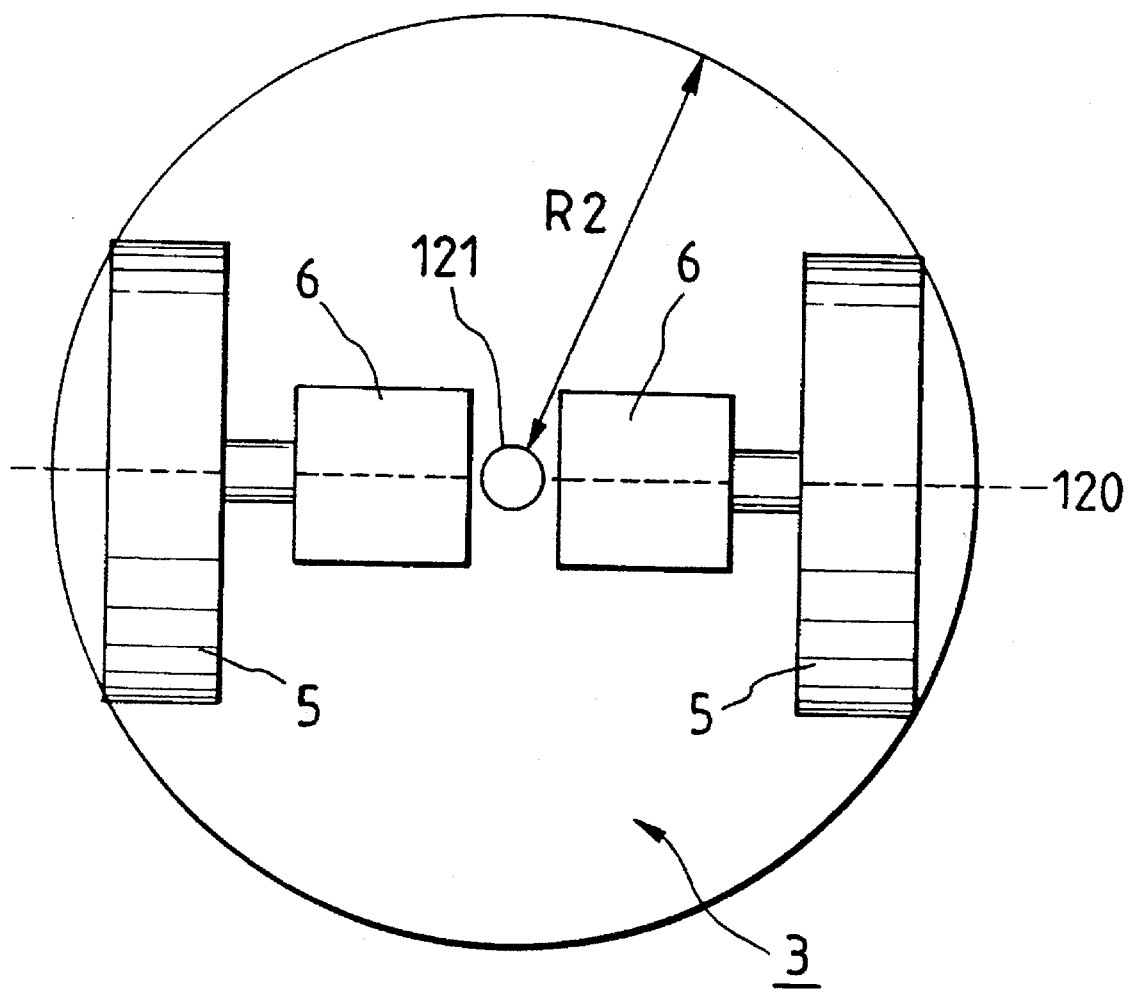
FIG. 24 is a diagram for explaining a turning radius of a driven wheel according to the conventional traveling carriage.

As shown in FIG. 8, in this preferred embodiment, the driven wheels 115, 116 have a common rotation axis 120, and further, the travel sections 71, 72 have the respective turning axes 122 and 123 which are located at different positions. Accordingly, a turning radius of each of the driven wheels 115, 116 becomes R1 as shown in FIG. 8. On the other hand, in the conventional traveling carriage, as shown in FIG. 24, since the left and right driven wheels 5 have the common turning axis 121, the turning radius becomes R2 which is larger than the turning radius R1. Accordingly, in this preferred embodiment, a space required for the pivotal motions of the travel sections 71, 72 can be reduced as compared with the conventional traveling carriage.

In the foregoing preferred embodiment, the driven wheels 115, 116 are mounted in the travel sections 71, 72. On the other hand, caterpillars or the like may be used instead of the driven wheels 115, 116.

Further, in the foregoing preferred embodiment, the gears 60 to 62 are used for ensuring the turning motions of the travel sections 71, 72 in phase with each other. On the other hand, it may be arranged to allow the travel sections 71, 72 to turn independently of each other. In this case, however, it is necessary to control steering phases of the travel sections 71, 72. Further, locking means, such as, a brake and position monitoring means, such as, an encoder are necessary for each of the travel sections 71, 72.

Further, in the foregoing preferred embodiment, the left and right steering plates 110 are used. On the other hand, the two steering plates 110 may be replaced by one steering plate. Alternatively, it may further be arranged that left and right steering plates each having a width corresponding to that of the driven wheel are provided for the driven wheels 115, 116 to run thereon when the travel sections 71, 72 are turned to change steered directions of the driven wheels. Further, as long as the travel sections 71, 72 can turn in phase with each other by means of, such as, the gears 60 to 62, one of the steering plates 110 may be omitted.

Now, a second preferred embodiment of the present invention will be described with reference to FIGS. 9A and 9B. The second preferred embodiment differs from the foregoing first preferred embodiment only in mounting structure of the steering plates 110.

Figure 9A:
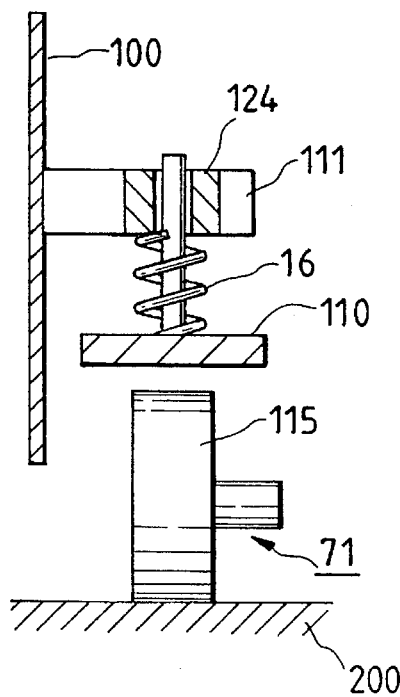
FIG. 9A is a diagram for explaining a mounting structure and an operation of a steering plate according to a second preferred embodiment of the present invention, wherein the driven wheel is at the given lowered position.
Figure 9B:
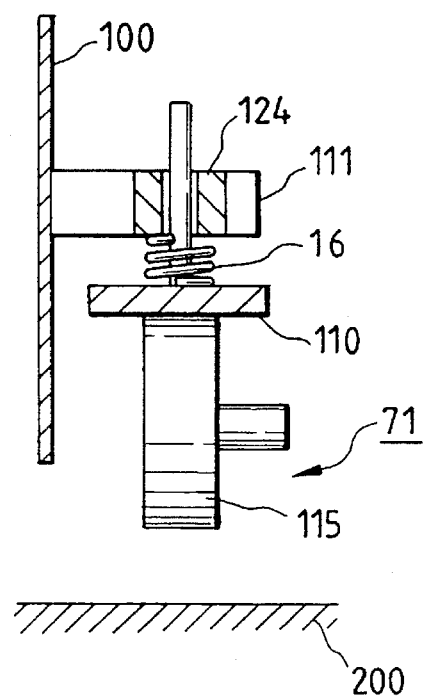
FIG. 9B is a diagram for explaining the mounting structure and the operation of the steering plate according to the second preferred embodiment, wherein the driven wheel is at the given raised position.

In FIG. 9A, a spring 16 is interposed between the steering plate 110 and an angle strut 111 fixed to the frame 100. The angle strut 111 is provided with a direct-acting slide portion 124 which receives therethrough an extended portion of the steering plate 110, so as to make stable extension/contraction actions of the spring 16. With this arrangement, as shown in FIG. 9B, even when the rising movement of the driven wheel 115, 116 is unstable, the driven wheel 115, 116 can be stably held in abutment with the steering plate 110. Further, the travel sections 71, 72 can be effectively prevented from receiving excessive forces.

Figure 10:
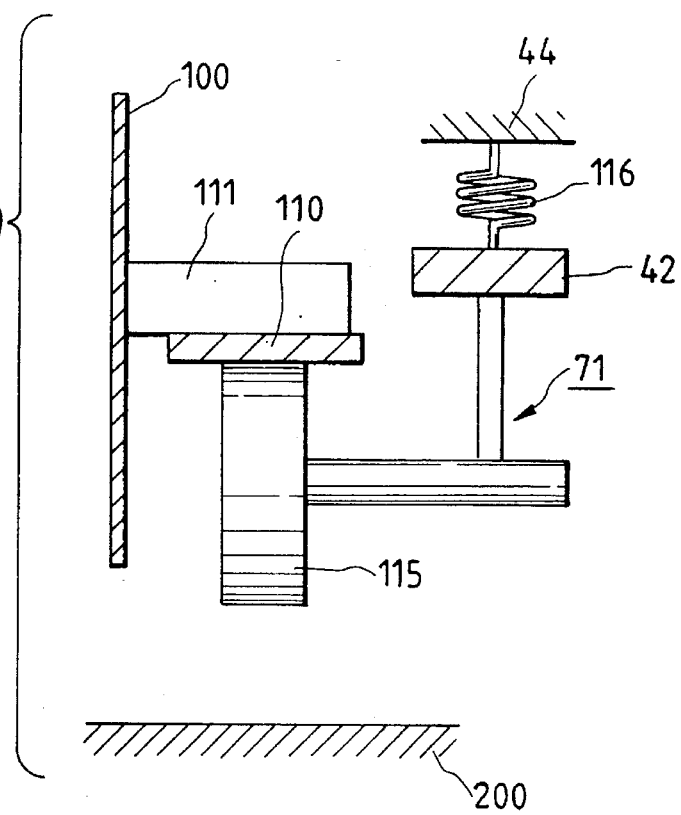
FIG. 10 is a diagram for explaining a modification of the structure shown in FIGS. 9A and 9B.

On the other hand, as shown in FIG. 10, the steering plates 110 may be fixed to the angle struts 111, while the springs 16 may be interposed between the lower plate 42 and the intermediate plate 44.

Figure 11:
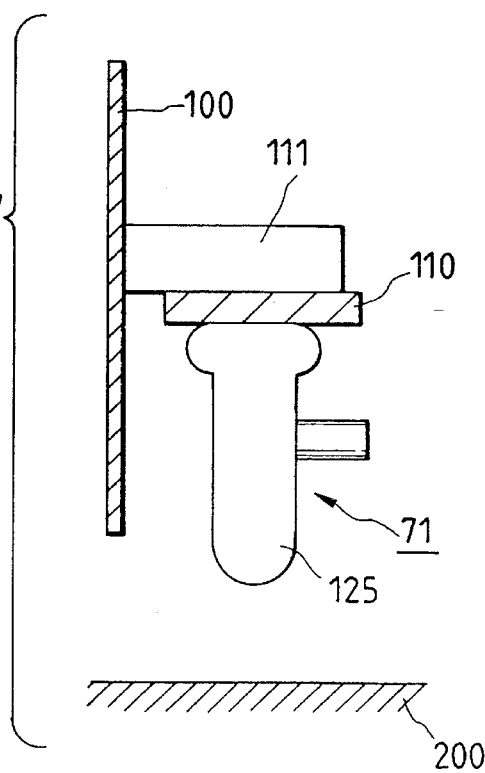
FIG. 11 is a diagram for explaining a modification of the structure shown in FIG. 10.

Further, as shown in FIG. 11, each driven wheel may be a soft driven wheel, such as, a pneumatic tire 125.

Now, a third preferred embodiment of the present invention will be described with reference to FIG. 12. The third preferred embodiment aims to prevent slip between the steering plates 110 and the driven wheels 115, 116.

Figure 12:
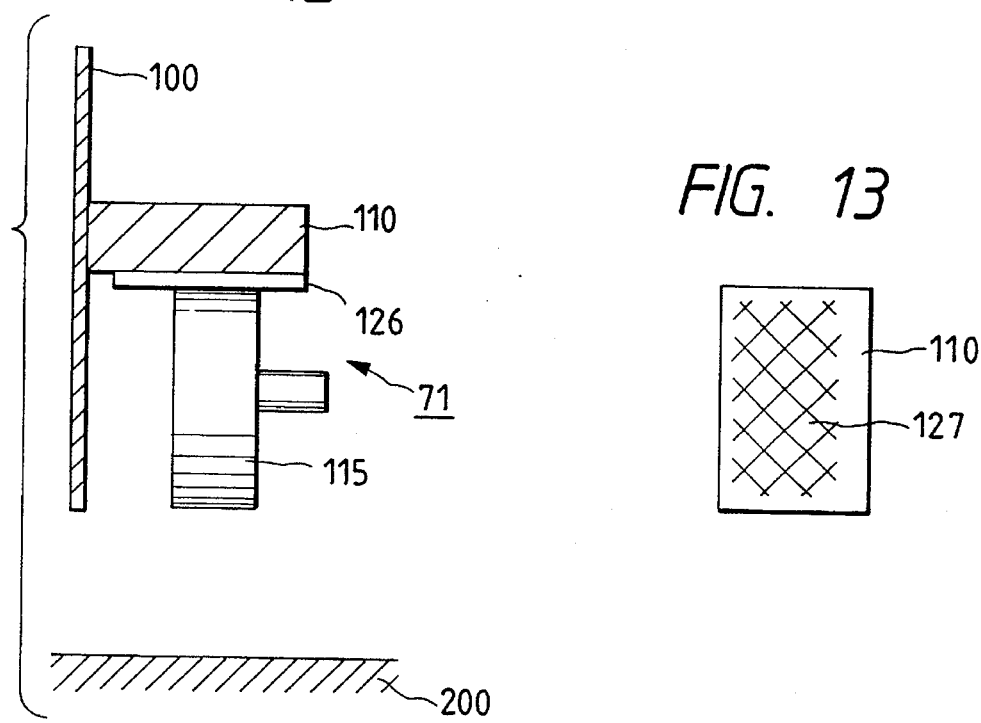
FIG. 12 is a diagram for explaining a mounting structure of the steering plate according to a third preferred embodiment of the present invention.

As shown in FIG. 12, on the lower surface of each steering plate 110, resin or rubber 126 or other antislipping materials may be applied.

Figure 13:
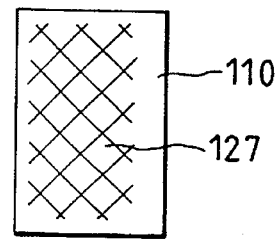
FIG. 13 is a diagram for explaining a modification of the structure shown in FIG. 12.

Further, as shown in FIG. 13, a knurling 127 may be formed on the lower surface of each steering plate 110 for preventing slip. As appreciated, FIGS. 12 and 13 aim to increase a friction coefficient of the lower surface of the steering plate 110 relative to the driven wheel, respectively.

Figure 14:
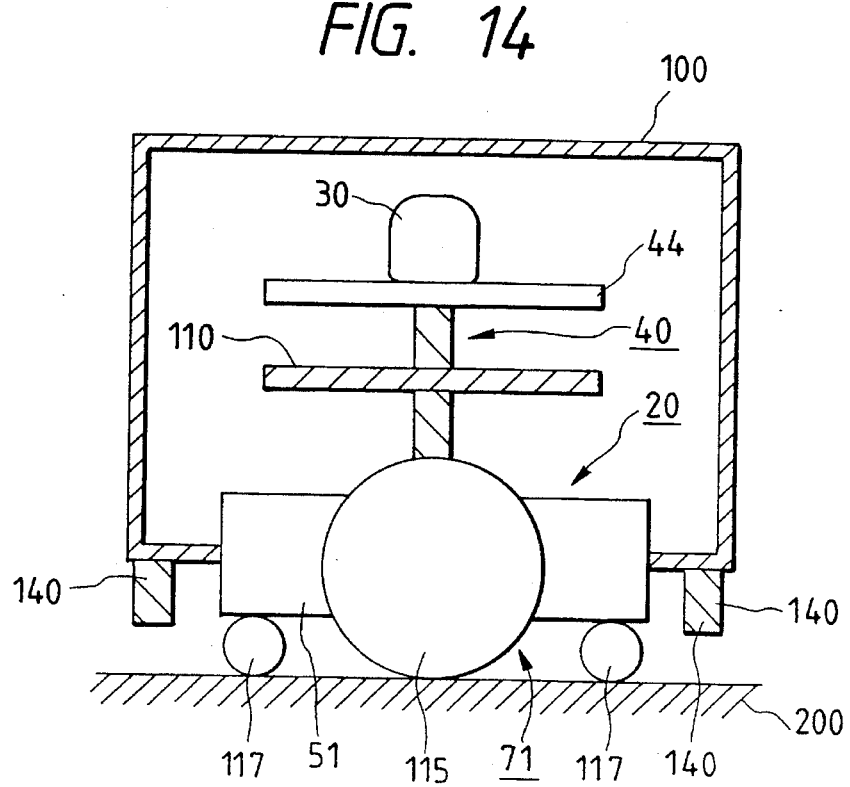
FIG. 14 is a diagram for explaining a structure according to a fourth preferred embodiment of the present invention, wherein casters are mounted to travel sections of a driver section of the traveling carriage.

Now, a fourth preferred embodiment of the present invention will be described with reference to FIG. 14.

In the foregoing first preferred embodiment, the caster springs 130 are necessary since the casters 117 are mounted to the frame 100. On the other hand, as shown in FIG. 14, when the casters 117 are mounted to the travel sections 71, 72, the caster springs 130 are not necessarily required.

Figure 15:
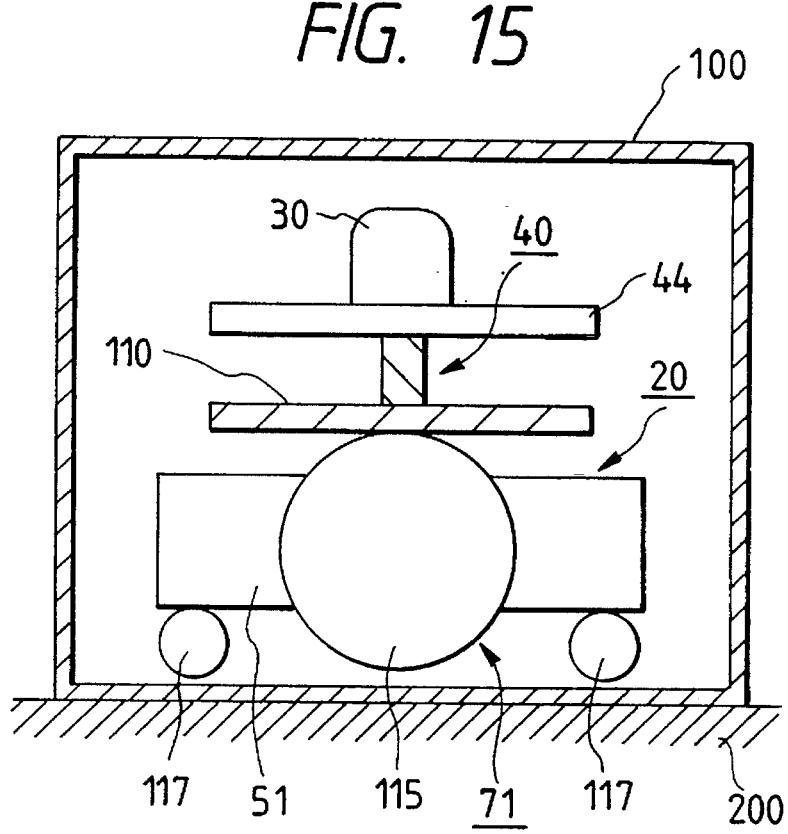
FIG. 15 is a diagram for explaining a modification of the structure shown in FIG. 14.

Further, as shown in FIG. 15, when the casters 117 are mounted to the travel sections 71, 72, the outriggers 140 may be omitted. In this case, a lower surface of the frame 100 itself is placed on the running surface 200 to fix the traveling carriage when the travel sections 71, 72 are raised into the frame 100.

Further, it may be effective to apply an antislipping material, such as, rubber to the flat lower end surfaces of the outriggers 140 or to perform an antislipping process, such as, a knurling process thereto.

Figure 16A:
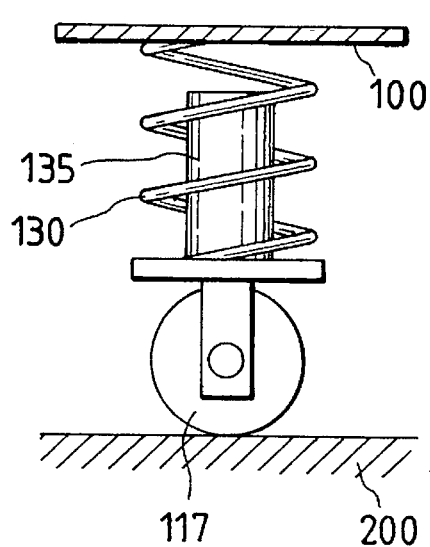
FIG. 16A is a diagram for explaining a modification of the structure shown in FIG. 1, wherein a spacer is provided in a caster spring for each of the casters.
Figure 16B:
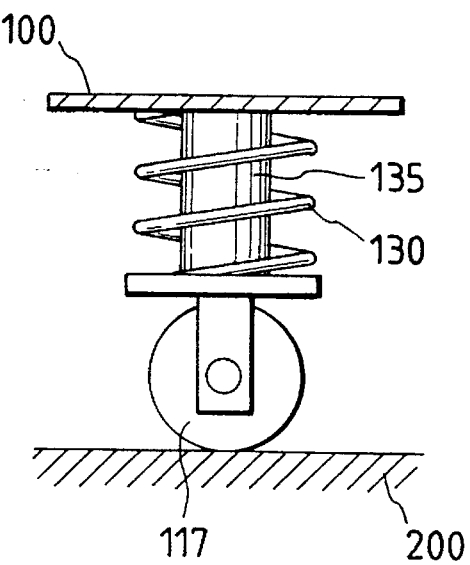
FIG. 16B shows the caster spring of FIG. 16A compressed.

Further, the frame 100 may be fixed relative to the running surface 200 without using the outriggers 140, by supporting the frame 100 using the two driven wheels 115, 116 and the four casters 117 with the caster springs 130 and further applying the brakes to the driven wheels 115, 116. However, in this case, the frame 100 is largely subjected to vibration due to the caster springs 130. For example, when arms of a robot are mounted on the frame 100, the frame 100 is caused to vibrate as the robot arms start to be operated. For avoiding the vibration of the frame, a spacer 135, as shown in FIG. 16A, is provided in the caster spring 130 for each caster 117. With this arrangement, when the caster spring 130 is contracted to cause an upper end of the spacer 135 to abut against the frame 100, as shown in FIG. 16B, vertical vibration of the frame 100 is prevented. Accordingly, the frame 100 may be reliably fixed relative to the running surface 200 by raising the driven wheels 115, 116 using the elevator section 40 and then stopping raising the driven wheels 115, 116 at a position where the frame 100 is lowered to abut against the spacer 135 and the driven wheels 115, 116 are not separated from the running surface 200. Specifically, in this state, the frame 100 is supported by the two driven wheels 115, 116 and the four casters 117. Accordingly, the frame 100 is prevented from vibration by the spacer 135, from displacement in the longitudinal directions by the brakes applied to the driven wheels 115, 116 and from slip in the lateral directions by a frictional force between the driven wheels 115, 116 and the running surface 200.

Figure 17A:
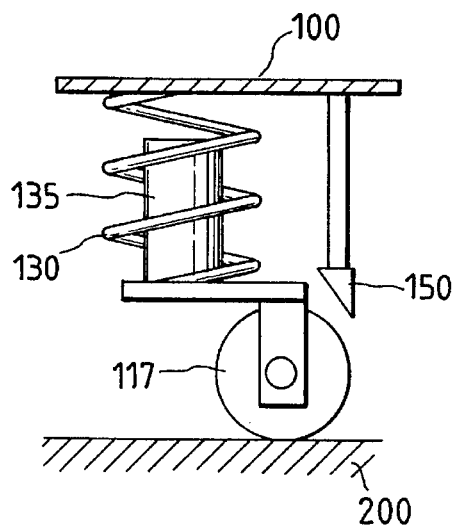
FIG. 17A is a diagram for explaining a modification of the structure shown in FIG. 16.
Figure 17B:
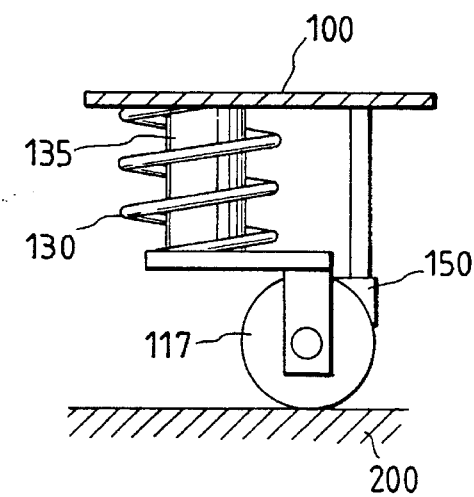
FIG. 17B shows the structure of FIG. 17A in a compressed state.

In a structure of FIG. 17A shows a modification of the structure shown in FIG. 16, including a brake member 150. As shown in FIG. 17B, when the driver section 20 is raised by the elevator section 40, the caster spring 130 is contracted to cause the frame 100 to abut against the spacer 135 so that the frame 100 is prevented from vibrating by the spacer 135. Simultaneously, the traveling carriage can be fixed on the running surface 200 due to the brake member 150 fixed to the frame 100.

Figure 18A:
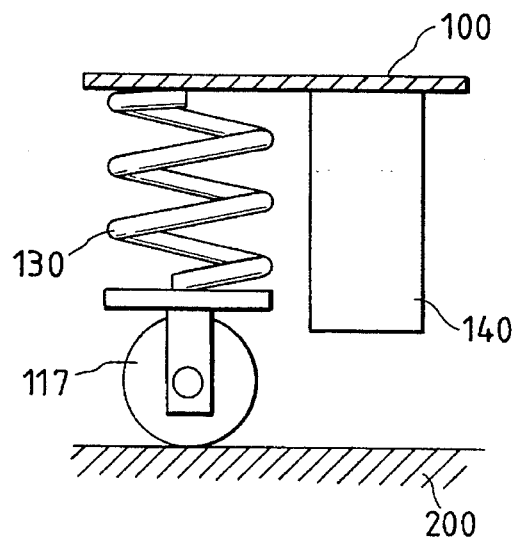
FIG. 18A is a diagram for explaining a structure, wherein an outrigger is unable to reach a running surface even when the caster spring is contracted.
Figure 18B:
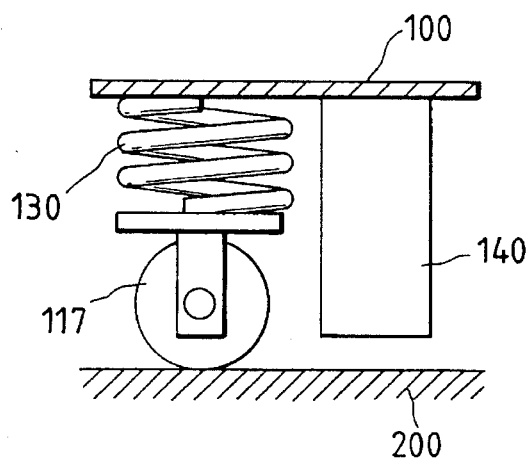
FIG. 18B shows the caster spring of FIG. 18A compressed.
Figure 19:
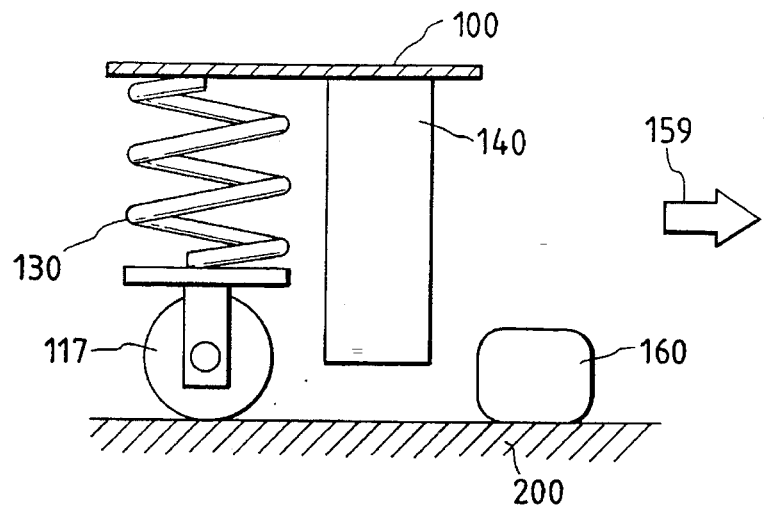
FIG. 19 is a diagram for explaining a positional relationship among the caster with the caster spring, the outrigger and an obstacle in the first preferred embodiment.
Figure 20A:
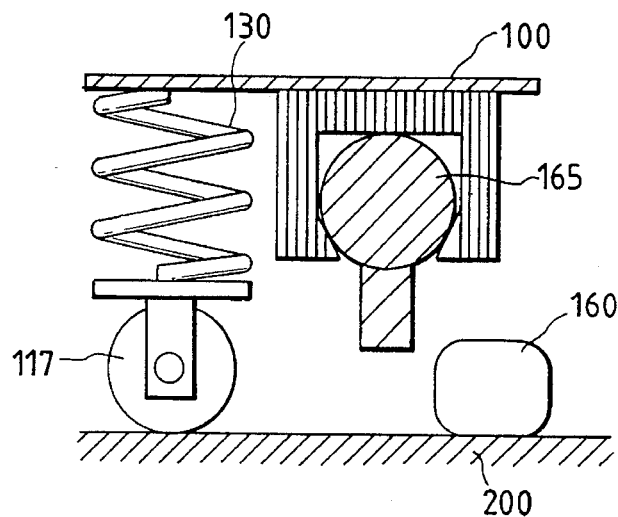
FIG. 20A is a diagram for explaining a structure of a modification of the structure shown in FIG. 19, wherein a ball-type joint is used for the outrigger.
Figure 20B:
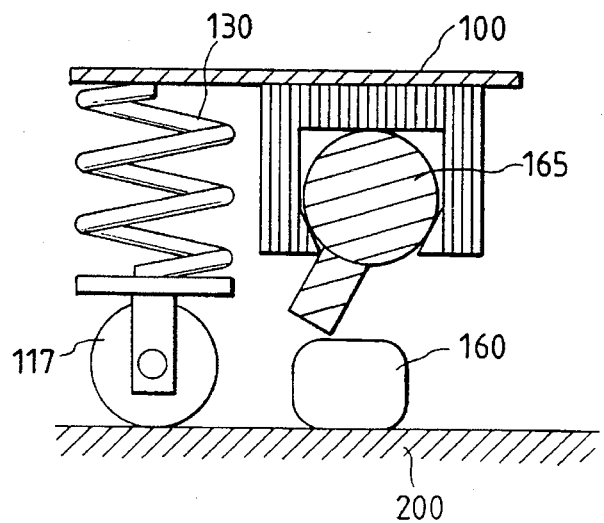
FIG. 20B is a diagram for explaining an operation of the structure shown in FIG. 20A.

As shown in FIG. 18A, when a distance between the lower end of the outrigger 140 and the running surface 200 is set larger than a contraction distance of the caster spring 130, the outrigger 140 is unable to reach the running surface 200, as shown in FIG. 18B. Accordingly, in the foregoing first preferred embodiment, the outrigger 140 should be mounted to the frame as being close to the running surface 200. With this arrangement, as shown in FIG. 19, when running in a direction 159, since the caster 117 is a wheel (compliance wheel), it can go over an obstacle 160. On the other hand, the outrigger 140 collides with the obstacle 160 and can not go thereover. For avoiding this situation, as shown in FIG. 20A, a ball-type joint 165 is used. As appreciated from FIG. 20B, the ball-type joint 165 swings to avoid the obstacle 160.

Figure 21A:
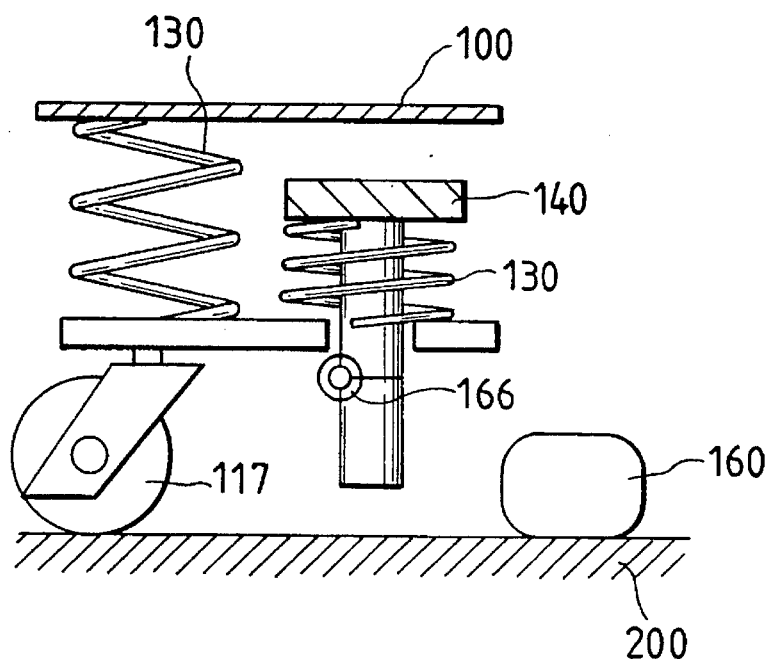
FIG. 21A is a diagram for explaining a structure of a modification of the structure shown in FIG. 19, wherein the caster is in the form of an offset caster and the outrigger is provided with a spring-biased hinge.
Figure 21B:
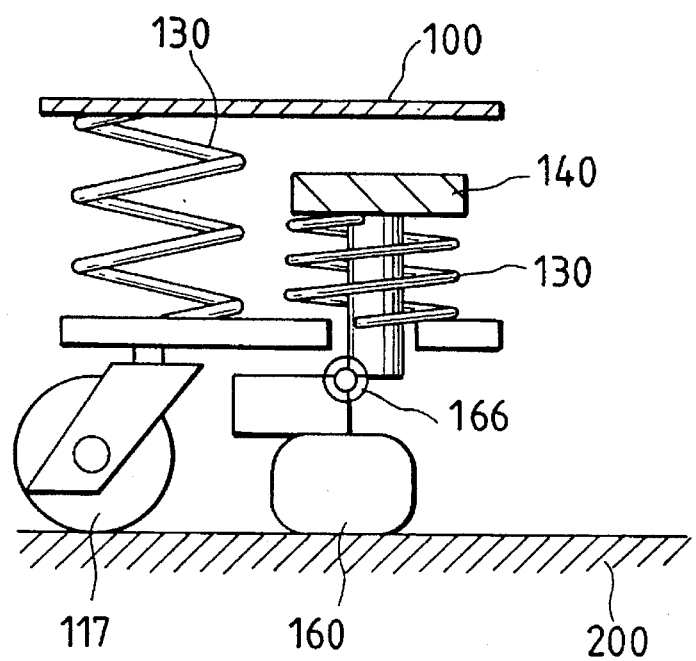
FIG. 21B is a diagram for explaining an operation of the structure shown in FIG. 21A.
Figure 22:
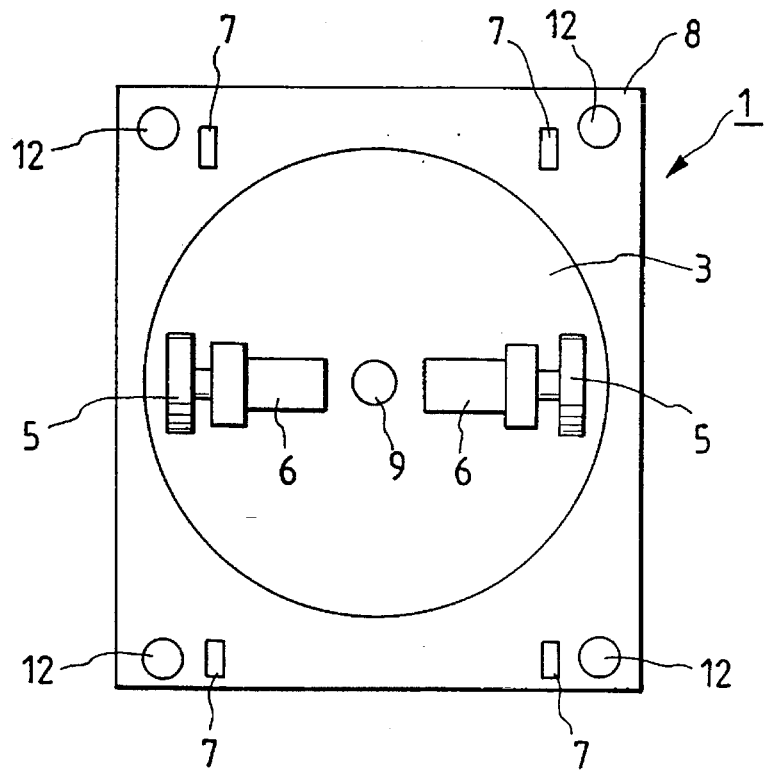
FIG. 22 is a diagram schematically showing a conventional traveling carriage.
Figure 23:
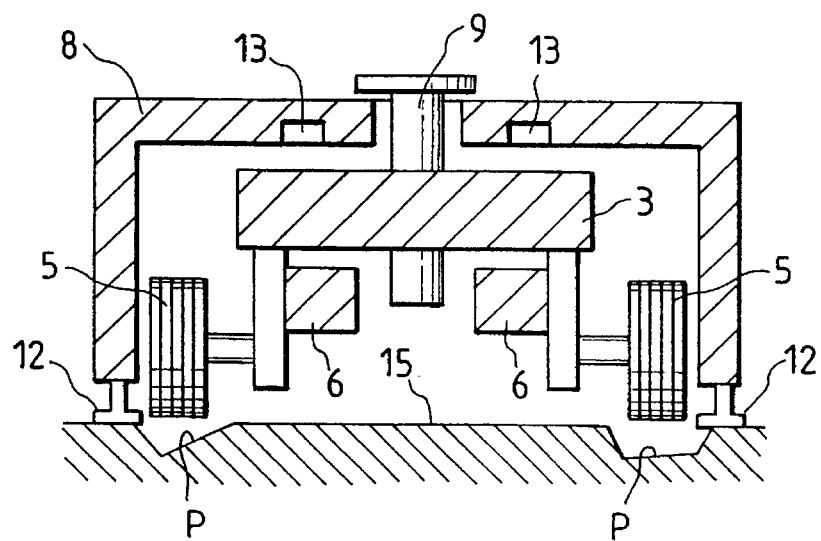
FIG. 23 is a diagram for explaining an operation of the conventional traveling carriage shown in FIG. 22.

Further, as shown in FIG. 21A, the caster 117 may be in the form of an offset caster and the outrigger 140 may be provided with a spring-biased hinge 166 at a bendable portion thereof and mounted to the offset caster 117. The spring-biased hinge 166 can be opened only in one direction. With this arrangement, when the outrigger 140 collides with the obstacle 160, the spring-biased hinge 166 is opened to bend the outrigger 140 so as to allow the outrigger 140 to go over the obstacle 160. After going over the obstacle 160, the spring-biased hinge 166 is returned to the initial posture by means of a spring restoring force. Since the outrigger 140 with the spring-biased hinge 166 is mounted to the offset caster 117, the outrigger 140 can be always oriented in such a direction as to enable to bend the outrigger 140.

It is to be understood that this invention is not to be limited to the preferred embodiments and modifications described above, and that various changes and modifications may be made without departing from the spirit and scope of the invention as defined in the appended claims.

What is claimed is:

1. A traveling carriage adapted for running on a running surface, said traveling carriage comprising:

a frame;

a pair of driven wheels rotatably coupled to said frame;

drive source means for rotating said pair of driven wheels;

elevator means for raising or lowering said driven wheels relative to said frame;

a leg member for fixing said frame relative to said running surface and preventing said traveling carriage from running on said running surface when said driven wheels are raised by said elevator means and separated from said running surface;

steering means for changing a steered direction of said driven wheels when said driven wheels are separated from said running surface with said frame being fixed relative to said running surface by said leg member;

a compliance wheel compliantly mounted to said frame; and coupling means disposed between said compliance wheel and said frame for allowing said compliance wheel to retract and extend, wherein, when said driven wheels are raised by said elevator means, said coupling means is compressed and said frame is lowered so that said leg member abuts said running surface thereby fixing said frame relative to said running surface and preventing said traveling carriage from running on said running surface.

2. The traveling carriage as set forth in claim 1, wherein said compliance wheel supports said frame and runs on said running surface when said traveling carriage runs on said running surface.

3. The traveling carriage as set forth in claim 1, wherein said leg member is mounted to a lower surface of said frame.

4. The traveling carriage as set forth in claim 3, wherein said leg member further comprises avoiding means for avoiding an obstacle on said running surface.

5. The traveling carriage as set forth in claim 1, wherein said steering means changes said steered direction of said driven wheels when said driven wheels are raised to a given controlled vertical level.

6. The traveling carriage as set forth in claim 1, wherein said driven wheels are disposed substantially at a middle portion of the traveling carriage, and said leg member is provided between said driven wheels and said compliance wheel.

7. A traveling carriage adapted for running on a running surface, said traveling carriage comprising:

a frame;

a pair of driven wheels rotatably coupled to said frame;

drive source means for rotating said pair of driven wheels;

an abutment plate disposed on said frame;

elevator means for raising or lowering said driven wheels relative to said frame;

fixing means for fixing said frame relative to said running surface when said driven wheels are raised by said elevator means and separated from said running surface; and steering means for changing a steered direction of said driven wheels when said driven wheels are separated from said running surface with said frame being fixed relative to said running surface by said fixing means, wherein said driven wheels, when raised, abut against said abutment plate, and wherein said driven wheels are turned to change said steered direction when said drive source means rotate said driven wheels on said abutment plate.

8. The traveling carriage as set forth in claim 7, wherein said abutment plate is provided with means for increasing a friction coefficient relative to said driven wheels.

9. The traveling carriage as set forth in claim 7, wherein said fixing means is formed by a lower surface of said frame itself.

10. The traveling carriage as set forth in claim 7, wherein said fixing means includes a leg member mounted to a lower surface of said frame, and wherein said leg member is placed on said running surface when said driven wheels start to be separated from said running surface.

11. A traveling carriage adapted for running on a running surface, said traveling carriage comprising:

a frame;

a pair of driven wheels rotatably and pivotally coupled to said frame, each of said pair of driven wheels having a turning axis about which each of said pair of driven wheels can pivot;

drive source means for rotating said pair of driven wheels;

elevator means for raising or lowering said driven wheels relative to said frame;

fixing means for fixing said frame relative to said running surface when said driven wheels are raised by said elevator means and separated from said running surface; and steering means for changing a steered direction of said driven wheels when said driven wheels are separated from said running surface with said frame being fixed relative to said running surface by said fixing means, wherein said steered direction is changed by turning each of said pair of driven wheels about its turning axis, said turning axes being located at different positions with a given distance therebetween, and wherein said drive source means includes a pair of drive sources which drive said driven wheels to turn about said turning axes, respectively.

12. The traveling carriage as set forth in claim 11, further comprising in-phase turning means for turning said driven wheels in phase with each other when said driven wheels are turned to change said steered direction.

13. The traveling carriage as set forth in claim 12, wherein said in-phase turning means comprises a gear coupled to each of said driven wheels, and a center gear meshed with both of said gears.

14. The traveling carriage as set forth in claim 13, wherein said center gear is associated with locking means for preventing said driven wheels from turning about their respective turning axes when said traveling carriage runs on said running surface with said driven wheels.

* * * * *